United States Patent
Jiang et al.

(10) Patent No.: US 10,417,118 B2
(45) Date of Patent: Sep. 17, 2019

(54) DEVELOPMENT-TIME AWARENESS OF A PRODUCTION DEPENDENCY INJECTION ENVIRONMENT

(71) Applicant: INTERNATIONAL BUSINESS MACHINES CORPORATION, Armonk, NY (US)

(72) Inventors: Fenghui Jiang, Hampshire (GB); Ashley Robertson, Hampshire (GB); Gordon Hutchison, Eastleigh (GB); Benjamin A. Confino, Chandler's Ford (GB); Thomas A. Evans, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/812,102

(22) Filed: Nov. 14, 2017

(65) Prior Publication Data

US 2019/0146902 A1      May 16, 2019

(51) Int. Cl.
*G06F 9/44*         (2018.01)
*G06F 11/36*        (2006.01)

(52) U.S. Cl.
CPC ...... *G06F 11/3684* (2013.01); *G06F 11/3688* (2013.01)

(58) Field of Classification Search
CPC ............ G06F 8/20; G06F 8/71; G06F 11/362; G06F 9/44505; G06F 11/3664; G06F 11/3644; G06F 11/3466; G06F 2201/865; G06F 11/3636; G06F 11/3684; G06F 11/3688
See application file for complete search history.

(56) References Cited

U.S. PATENT DOCUMENTS

| | | | |
|---|---|---|---|
| 8,863,074 B2* | 10/2014 | Trent | G06F 8/20 717/104 |
| 9,208,064 B2 | 12/2015 | Fryc | |
| 9,361,077 B1 | 6/2016 | Hale | |
| 9,384,005 B2 | 7/2016 | Paliwal | |

(Continued)

OTHER PUBLICATIONS

Gartner, "Application Release Automation (ARA)", Gartner IT Glossary, https://www.gartner.com/it-glossary/application-release-automation-ara/, Gartner IT Glossary, 1 Page.

(Continued)

*Primary Examiner* — Wissam Rashid (74) *Attorney, Agent, or Firm* — Kenneth Han (57) ABSTRACT

Development-time awareness of production environment dependency injection configuration in a software development or test environment. In a software development or test environment, metadata is retrieved relating to configuration data of injection sources and target injection sites in applications of a configured target production server or a representation of a configured target production server. A configuration data structure is formed that cross-references target injection sites and injectable sources determined from the configuration data, the configuration data structure being associated with the production server and available to the software development or test environment. The configuration data structure is referenced to carry out dependency injection related features.

20 Claims, 6 Drawing Sheets

(56) References Cited

U.S. PATENT DOCUMENTS

| | | | |
|---|---|---|---|
| 9,612,821 B2 | 4/2017 | Iyer | |
| 2011/0185340 A1* | 7/2011 | Trent | G06F 8/20 717/104 |
| 2013/0042152 A1* | 2/2013 | Fryc | G06F 11/3684 714/38.1 |
| 2015/0271121 A1* | 9/2015 | Wells | H04L 51/16 709/206 |
| 2016/0094647 A1* | 3/2016 | Mordani | H04L 47/70 709/226 |
| 2018/0081644 A1* | 3/2018 | Sahoo | G06F 8/20 |

OTHER PUBLICATIONS

Gibson, "Working with Events in CDI", https://netbeans.org/kb/docs/javaee/cdi-events.html, printed Nov. 14, 2017, pp. 1-6.

JBoss, "JBoss Tools News and Noteworthy", http://docs.jboss.org/tools/whatsnew/index.html, printed Nov. 14, 2017, pp. 1-10.

JBoss, "JBoss Tools", CDI, http://tools.jboss.org/features/cdi.html, printed Jun. 14, 2019, pp. 1-5.

Jetbrains, "CDI Tool Window", IntelliJ Idea 2016.2 Help, https://www.jetbrains.com/help/idea/2016.2/cdi-tool-window.html,, printed Jun. 14, 2019, pp. 1-3.

Jetbrains, "Context and Dependency Injection (CDI)", IntelliJ Idea 2016.2 Help, https://www.jetbrains.com/help/idea/2016.2/context-and-dependency-injection-cdi.html, printed Jun. 14, 2019, pp. 1-5.

Jetbrains, "IntelliJ Idea: The Java IDE for Professional Developers", https://www.jetbrains.com/idea/, Sep. 2, 2017, pp. 1-7.

Kouba, "Weld Probe—inspect your CDI application at runtime", Martin Kouba's Blog, JBoss Developer, https://developer.jboss.org/people/mkouba/blog/2015/02/05/weld-probe-inspect-your-cdi-application-at-runtime, Feb. 5, 2015, pp. 1-5.

Mell et al., "The NIST Definition of Cloud Computing", National Institute of Standards and Technology, Special Publication 800-145, Sep. 2011, pp. 1-7.

Oracle, "Using Contexts and Dependency Injection for the Java EE Platform", Middleware / Oracle WebLogic Server, 12c Release 1 (12.1.1), Fusion Middleware Developing Applications for Oracle WebLogic Server, https://docs.oracle.com/cd/E24329_01/web.1211/e24368/cdi.htm#WLPRG509.

Wikipedia, "DevOps", https://en.wikipedia.org/wiki/DevOps, printed Nov. 14, 2017, pp. 1-6.

Wikipedia, "Infrastructure as Code", https://en.wikipedia.org/wiki/Infrastructure_as_Code, printed Nov. 14, 2017, pp. 1-3.

\* cited by examiner

FIG. 6

DEVELOPMENT-TIME AWARENESS OF A PRODUCTION DEPENDENCY INJECTION ENVIRONMENT

BACKGROUND

The present invention relates to software development or test environments, and more specifically, to development-time awareness of a production dependency injection environment.

As the pressure to reduce cycle time in software development continues, one of the enablers for "release early, release often" is to have less of a hurdle to jump over to get new versions of applications and services into production. This desire has been channeled into the current culture of development and operations "DevOps" within which "release automation" seeks to allow development to more automatically flow software components from development, through quality assurance, and into production while minimizing costly and error prone manual activities.

To some extent, this extends the reach of developers who deliver "code" downstream which directly controls the task of production system configuration and administration. Thus, to allow for continuous delivery, change management and automation of system provisioning, configuration and control, the concept of "Infrastructure as Code" has arisen. In Infrastructure as Code, artifacts are created by developers that control production.

Dependency injection allows for artifacts like software service implementations to be "injected" into source code, initializing variables to values that are appropriate for the environment the code is running in without the code having to change or actively resolve the values. At one scale, this involves the "scope" the code is running in effecting the particular instance injected, for example the particular transaction, session or application can effect which instance is accessed via a field. At another scale, a common advantage cited when dependency injection arose was that one can have different development, test-scaffolding, and production implementations of services and these are picked up appropriately by the running code which does not need to be modified as it flows from development to test to production.

Java "Contexts and Dependency Injection" (CDI) (Java is a trade mark of Oracle Corporation) provides such a framework for "typesafe" injection. However, it is difficult to work out where the object that is injected is from, whether there is any injection available before the code is run and how what might be injected may vary from development to test to production. To some extent this goes against the DevOps ethos as it makes it harder for the developer to be fully aware of what will run in production and thus makes delivery to the production environment without the traditional systems/production test more risky.

Even once an application has safely passed test and is running in production, on updating an application, it is hard to envisage whether an update has caused some undesirable consequences.

In any environment, whether development, test or production, what is actually injected depends on the eligible artifacts that are found on the classpath.

This depends on what the code looks like (whether the class is of the right type, good constructor, good qualifier etc.). This is commonly inferable by the developer using change control and versioned library systems. However, occasionally the developer and production environments can become out of sync, particularly if servicing multiple releases of the code.

This also depends on what is installed, namely artifacts present in the environment in the server, shared libraries or packaged with the application, and what the classpath is in the production environment. These factors are less commonly available and are usually only available statically after the fact in problem determination scenarios.

BRIEF SUMMARY

According to an aspect of the present invention there is provided a computer-implemented method for development-time awareness of a production dependency injection environment, wherein the method is carried out in a software development or test environment comprising: retrieving metadata relating to configuration data of injection sources and target injection sites in applications of a configured target production server or a representation of a configured target production server; forming a configuration data structure cross-referencing target injection sites and injectable sources determined from the configuration data wherein the configuration data structure is associated with the production server and available to the software development or test environment; and referencing the configuration data structure to carry out dependency injection related features in the software development or test environment.

According to another aspect of the present invention there is provided a system for development-time awareness of a production dependency injection environment in a software development or test environment, comprising: a processor and a memory configured to provide computer program instructions to the processor to execute the function of the components; a configuration retrieving component for retrieving metadata relating to configuration data of injection sources and target injection sites in applications of a configured target production server or a representation of a configured target production server; a configuration data structure component for forming a configuration data structure cross-referencing target injection sites and injectable sources determined from the configuration data wherein the configuration data structure is associated with the production server and available to the software development or test environment; and a referencing component for referencing the configuration data structure to carry out dependency injection related features in the software development or test environment.

According to a further aspect of the present invention there is provided a computer program product for development-time awareness of a production dependency injection environment in a software development or test environment, the computer program product comprising a computer readable storage medium having program instructions embodied therewith, the program instructions executable by a processor to cause the processor to: retrieve metadata relating to configuration data of injection sources and target injection sites in applications of a configured target production server or a representation of a configured target production server; form a configuration data structure cross-referencing target injection sites and injectable sources determined from the configuration data wherein the configuration data structure is associated with the production server and available to the software development or test environment; and reference the configuration data structure to carry out dependency injection related features in the software development or test environment.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

A method and system provided in an integrated development environment or a test environment are described that provide deployment-time awareness by pulling configuration data directly from a configured target production environment for the purposes of improving the likeness of the development environment that is used to develop and test applications.

An integrated development environment (IDE) is a software application that provides comprehensive facilities to computer programmers for software development. An IDE may consist of a source code editor, build automation tools and a debugger. IDEs may have intelligent code completion and may contain a compiler, interpreter, or both. IDEs present a single program in which development is done. This program typically provides many features for authoring, modifying, compiling, deploying and debugging software. The described method and system are provided in the context of an IDE. However, they may also be included in test environments and the term development environment should be interpreted to include test environments.

IDEs have functionality to support dependency injection of objects into source code. In "Infrastructure as Code" artifacts are created by developers that control production. Dependency injection allows for artifacts like software service implementations to be "injected" into source code, initializing variables to values that are appropriate for the environment the code is running in without the code having to change or actively resolve the values. "Contexts and Dependency Injection" source selection involves the "scope" the code is running in which can affect the particular instance injected, for example, the particular transaction, session or application can affect which instance is accessed via a field.

A common advantage cited when dependency injection arose was that one can have different development, test-scaffolding, and production implementations of services and these are picked up appropriately by the running code which does not need to be modified as it flows from development to test to production.

The described method and system enable configuration data to be used from a production server to provide information to the developer in an IDE about injected elements that are likely to be injected in the production deployment. The configuration data may also be used to control local, development stage, debugging execution.

Enabling the IDE to tie together the injection source and target results in a number of IDE assisted refactoring and other assistive technologies being possible. Injections that are not uniquely qualified may be spotted and machine assistance provided for extra qualifications being refactored and missing sources of required injected material spotted early.

Figure 1:
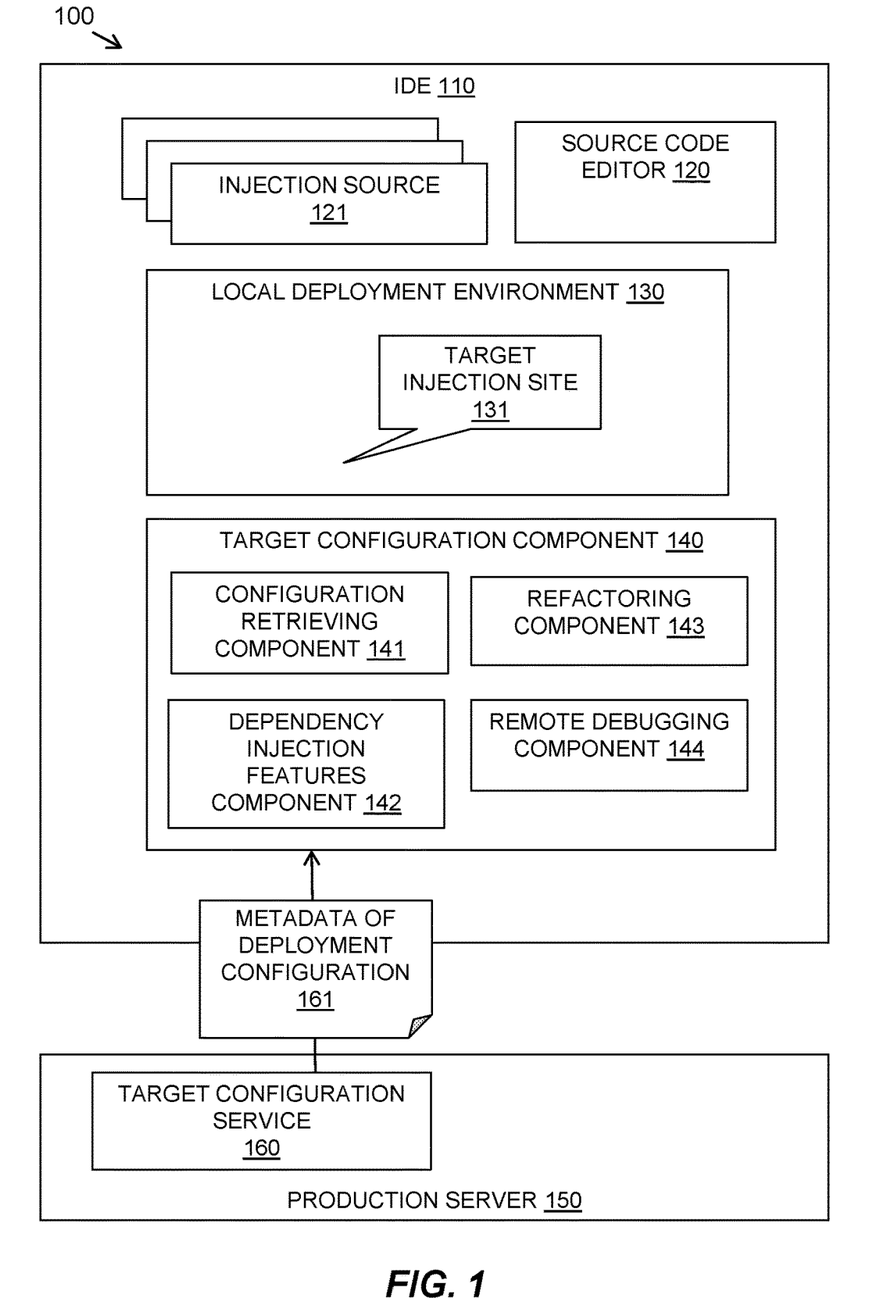
FIG. 1 is a schematic diagram of an example embodiment of system in which the present invention may be implemented.

Referring to FIG. 1, a schematic diagram shows an example embodiment of a system 100 in which the described method may be implemented.

An IDE 110 may be provided including a source code editor 120 for developing source code in which injection sources 121 (for example, beans or other objects) may be inserted into a local version of a deployment environment 130 (for example, an application container) at target injection sites 131.

A production server 150 or production environment, or a serialized flat-file version of the datafile that can be retrieved from it and provided at the IDE 110, includes a target configuration service 160 for obtaining configuration data of the production environment.

The target configuration service 160 may be a microservice that runs on the target production server 150 that can be used, creating minimal load, to retrieve data about the production configuration. The retrieved data is provided as metadata 161 of the deployment configuration. The metadata 161 may include details, for each of the applications installed, of the specific injection sources that reside on the defined location as injectable objects (for example, on a classpath as injectable beans), together with the class types of those objects and any associated qualifiers. Furthermore, the data from the production server 150 may include such "server wide" shared configuration data as would be added to a new application that is not yet installed on the server, so that, with the addition of the defined location and object information that is included with a new application, the resulting "Contexts and Dependency Injection" configuration data for a proposed but as yet not installed new application may be predicted.

The target configuration service 160 serves out the metadata 161 on the installed applications and the resolved injections whether those applications are running or not. This creates infrastructure as code where a subset of the production infrastructure configuration is embodied as a text or JavaScript object notation (JSON) (JavaScript and JSON are trademarks of Oracle Corporation) artifact on request.

This metadata 161 may be made available, for example, via a Representational State Transfer (REST) hypertext transfer protocol (HTTP) endpoint that is served by the production server 150.

The described system provides a target configuration component 140 at the IDE 110 for receiving and using the metadata 161 of the deployment configuration in the development and testing environment. The target configuration component 140 may include a configuration retrieving component 141 and a dependency injection features component 142. The dependency injection features component 142 may enable the editor 120 to use the production configuration data when developing the code. The target configuration component 140 may also include additional services such as a refactoring component 143 and a remote debugging component 144 that uses the configuration data as described further below.

The set of deployment targets and a default deployment target production server 150 to use in the IDE's editors may be set in a similar way to how IDEs configure unit test deployment servers.

The user may configure their IDE 110 with the address of the default production server 150. A serialized flat-file version of the datafile of a production server 150 that can be retrieved from it may be used instead of the production server 150 for obtaining the configuration data, if security concerns prefer that the production server 150 does not directly provide this service. This flat file is the manifestation of the production "Infrastructure as code" (for example in Extensible Markup Language (XML)) in the user's IDE 110.

Having IDE network connectivity is common as IDEs already access the network, for example, to integrate with library systems, to publish artifacts to configured servers and to report usage data to the IDE development team. Therefore IDE network connectivity may be used to connect to the production server 150.

Figure 2:
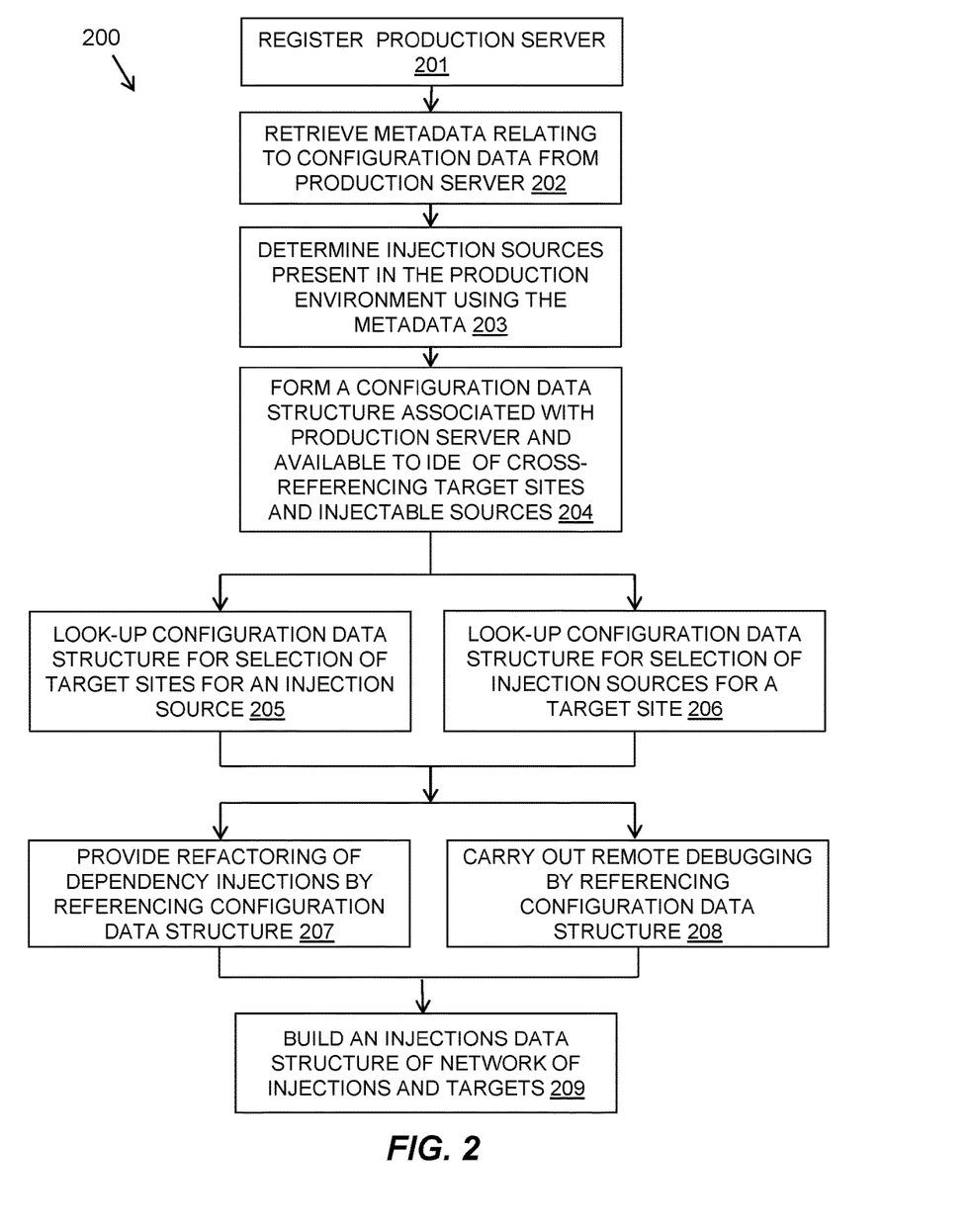
FIG. 2 is a flow diagram of a first example embodiment of a method in accordance with the present invention.

Referring to FIG. 2, a flow diagram 200 shows an example embodiment of the described method as carried out at a target configuration component 140.

The target configuration component 140 at an IDE 110 may register 201 one or more production servers 150, similarly to the way that an IDE can register servers for deployment of built artifacts. The registration 201 may receive information from a user defining a Uniform Resource Locator (URL) that may be used as a REST interface to retrieve production server configuration metadata. The defined URL may be registered for a production server with a user understandable name and optional additional information such as user identifier and password information, or a private key.

The registered production servers 150 may provide a web service that provides the relevant dependency injection related metadata 161 relating to configuration data. The metadata 161 is likely to be small in size and may only be updated when applications are deployed. The IDE 110 requires only one copy of this data per configured target system and it only needs to be refreshed when applications are deployed.

This configuration data information on the production server 150 can be retrieved 202 and utilized by the target configuration component 140 of the IDE 110 to allow functionality for the developer and regression tests to see behind a dependency injection and check in real time what actually happens in production and not just in the current developer IDE.

The metadata 161 relating deployment and injection configuration data may be retrieved 202 from the production server 150 when the IDE 110 is started or when refresh is requested when the IDE 110 is started up. The IDE 110 may initiate a request to the production server 150, for example, using a REST HTTP interface, to retrieve the metadata 161. In one embodiment, this may include for each of the applications installed, the specific injection sources that reside on the location as injectable objects (for example, on a classpath as injectable beans), together with the class types of those objects and any associated qualifiers. This may also include shared configuration data as would be added to a new application that is not yet installed on the server, so that, with the addition of the location and object information that is included with a new application configuration data may be predicted for a proposed but as yet not installed new application.

The metadata 161 may be used to determine 203 injection sources that are present in the environment of each installed application. This may be a subset of the applications that may currently exist in the IDE 110. The data required may include location parameter data used by the application, archives present on the location, injectable objects present in the archives, and target injection sites in the archives, and class and qualifier information of injection objects.

The method may form 204 a configuration data structure available to the IDE 110 and associated with the registered production server 150. In one embodiment, the data structure may be a two-dimensional data structure in which target sites are cross-referenced against injectable sources. This may be provided in a hierarchical manner. Target sties may be defined in levels of applications and shared library locations, individual applications and shared archives, individual injectable objects, and target injection sites. Injectable objects may be defined in levels of applications and shared library locations, individual applications and shared archives, individual injectable objects, and qualifiers to differentiate more than one version of an injectable object.

Dependency injection related features may be carried out at the IDE 110 at both an injection target location in code and at an injection source by referencing the configuration data structure.

The method may look-up 205 the configuration data structure to obtain a selection of target locations for an injection source when editing an injection source. The method may also look-up 206 the configuration data structure to obtain a selection of injection sources when editing a target injection site.

As the IDE can tie together the injection source and target locations, the method may provide 207 assisted refactoring of the dependency injections by referencing the configuration data structure.

The method may carry out 208 remote debugging from the IDE with "step into" being resolved correctly to the actual implementation that is going to be injected in production by referencing the configuration data structure.

An injections data structure that describes the network of injections between implementations and targets may be built 209 and updated after each application or shared library is deployed or a location (for example, a classpath) is changed on the production server. Such an injections data structure may describe a graph with injected software sources and target injection points within other software objects or components being the nodes of the graph and the directional edges of the graph representing the relationships between an injection source implementation source's node and the node containing the site that the implementation is injected into. Nodes may be labeled by the name of the software object/ class type and, for targets, internally contain the injection target site variable name. Edges may be labeled "injected into" or with any particular qualifiers that are used to constrain the matching types as described in, for example, the "Contexts and Dependency Injection" specification.

Further details of an example implementation are described below. In dependency injection in a development environment, components are injected into an application including the ability to constrain at deployment time which implementation of a particular interface is injected. The components have well-defined types and can be further qualified.

In one example implementation, the injection source or object may be beans; however, other objects may also be inserted. A bean class for valid bean types in Java Enterprise Edition (Java and Java EE are trademarks of Oracle Corporation) deployable resources are those that will be packaged into application ear files.

In dependency injection, a bean is a source of contextual objects that define application state and/or logic. A component is a bean if the lifecycle of its instances may be managed by the container according to the lifecycle context model defined in the CDI specification. A bean type may define a client-visible type of the bean.

Qualifiers may be used to provide various implementations of a particular bean type. A qualifier is an annotation that is applied to a bean. If there is more than one bean that implements a particular bean type, the injection point can specify exactly which bean should be injected using a qualifier annotation.

An IDE editor may bring together information from XML configuration files and annotations. The editor may provide content assist when developing the code. The editor may also provide annotations of methods to be used by the developer. One annotation is for a producer method that acts as a source of objects to be injected. This may be annotated as @Produces. Another annotation is for an injection target location, such as @Inject.

When working in an editor, shortcut keystroke commands may be used that may be defined by the particular IDE. These may be adapted to accommodate the described functionality. Code or content assist tools may also be modified to assist in the enabled functionality.

An example embodiment is described below based on the Eclipse IDE (Eclipse is a trademark of The Eclipse Foundation). A new production server may be added to or registered with an IDE by defining a URL that may be used as a REST interface to retrieve the production server configuration metadata.

The Eclipse Java Enterprise Edition IDE default perspective displays a window, which has a number of tabs providing options including: Markers, Properties, Servers, Data Source Explorer, Snippets, Console, Progress, Search.

Clicking on the "Servers" tab produces the 'Servers" panel. Right-clicking on the "Servers" panel area produces a context menu, one of the options of which is "new". Selecting "new" gives a further three options:
Server (This could be changed to "Test Server");
Server Environment File;
Configuration Dropin.

The described embodiment may add a further option to this list such as:
"Production Server".

Selecting new "Production Server" may create a panel form that has a Name, URL, and other options as desired, for example, required security options such as a valid Userid/Password combination or private key.

The "Name" may be a user understandable name and the "URL" may be the target URL that the IDE can use as a REST interface to retrieve the production server configuration metadata. The user may complete this form and presses the "Finish" button.

The IDE may then use the URL to initiate a request to the server using, for example, a REST HTTP interface, that requests the server's application, injectable bean and classpath metadata in a form such as a text string in a format such as XML or JSON.

The IDE may then transform the text string to Java object format and store it as configuration data associated with that production server.

The data may include information that can be used to determine the injection sources that are present in the environment of each installed application. This may be a subset to the applications that currently exist in the IDE. The data required to do this is: the classpath used by the application, the jars/archives present on the classpath and the injectable beans present in those Java archives and the "@Inject" target sites that are in those archives together with the Class and Qualifier information of what is injected.

This data can be used to form a two-dimensional table data structure. The rows of the table may represent "TO" and the columns may represent "FROM".

Individual row labels representing "TO" sites may be populated with particular Java @Inject targets sites that cause injections but organized into a hierarchical order (like sections/headers of a document). The levels of hierarchy may be:
1. Application, Shared Library Locations;
2. Individual applications and shared archives;
3. Individual Classes/Beans;
4. Target Inject Sites (scopes+variable names): Class-Attribute-Name or Method-Parameter-Name, or Scope+VariableName.

The column labels representing "FROM" sites may be populated with particular Java Bean sources that can supply injections but organized into a hierarchical order (like sections/headers of a document). The levels of hierarchy may be:
1. Application, Shared Library Locations;
2. Individual applications and shared archives;
3. Individual Classes/Beans;
4. Qualifiers (used to differentiate more than one version of an injectable class).

The described method and system enable selection of target sites for an injection source. For example, when editing an injectable bean, the user may enter a command and be shown all the places where that bean implementation is injected into the production server.

When a user selects a code assist on an injection source, for example at the site of an @Produces annotation, the retrieved metadata may be used to show a list of target sites that can consume that object. This may be similar to the known "find references" function. If the user repeats the key stroke, the next registered deployment environment is used to drive the population of the data displayed.

The described method and system enable selection of possible injection sources for a target location. When editing an injection target location such as when the cursor is on the definition line of an @Inject variable or the cursor points to the variable name in code, a command may show the source implementation code which may be selected and opened in an editor tab.

In one example, a user may use code assist on an @Inject field, and the possible sources that may be injected are displayed. One can be selected and its source code jumped to, for example, in a similar manner to an "open declaration".

The local deploy environment at the IDE may be displayed and, if the user uses code assist a second time, the next registered deployment environment is used to drive the population of the data displayed.

The editor may create a coding time warning marker and, as is typical, underline any @Inject which would be ambiguous should the application be re-redeployed or when a software bean intended as an injection source has zero inject sites that it would be applied to.

In such cases of ambiguity, the IDE may offer the user a choice of implementations with an IDE automated refactoring that can insert a @Qualifier to uniquely tie together that ambiguous @Inject site with a particular implementation as selected by the user.

Now that the IDE can tie together the injection source and target site, a number of IDE assisted refactoring and other assistive technologies are possible. Refactoring may be applied with IDE assistance ensuring correct code refactoring across the multiple affected code locations and allowing visibility of any impact to the downstream production environment.

When enabling selection of possible injection sources for a target location, the following methods may be applied.

If more than one possible source is valid:

a) an error may be flagged;

b) an "insert qualifier" refactoring action may be offered and applied with machine assistance;

c) The inject may be converted to a "@Inject @Any Instance<MyBeanType> myBeans;" form with skeleton code for selecting the instance.

If no source is valid:

a) If the type is too narrow—such as the use of a concrete class rather than an interface, or the use of a specific subclass/interface—then widening may be offered;

b) If the classpath looks like it needs amending then this may be suggested also.

Additionally the IDE may warn if what is going to be injected is different from what will be observed in the local development environment.

Using the above example in the Eclipse IDE, examples of this functionality are described. The IDE may make use of the production server configuration data while the user is editing code. The following are examples:

Show Source: At an @Inject site with code such as:

```
@Inject CreditCardProcessor processor;
                      //Cursor at "^" position.
```

The user may move the cursor onto the "@Inject" string and press a "show definition" key to see where the source of the injected value is in the production server and jump to the equivalent code if the application is present in the IDE workspace.

Ambiguous Resolution: At an @Inject site with code such as:

```
    @Inject CreditCardProcessor processor;
           ~~~~~~~~~~~~ //Cursor at "^" position.
```

The IDE may place a "warning marker" if it recognizes that there are multiple potential sources for this injection. If the user presses a "Content Assist" keystroke, the IDE may offer to insert an appropriate @Qualifier. This may be selected from the set of existing @Qualifiers that are present in the valid sources or may be by offering a new Qualifier that can also be inserted into a particular source and its clients as an IDE code refactoring.

No Matching Source: At an @Inject site with code such as:

```
    @Inject CreditCardProcessor processor;
           ~~~~~~~~~~~~ //Cursor at "^" position.
```

The IDE may place a "warning marker" if it recognizes that there are no potential sources for this injection. If the user presses a keystroke for "Quick Fix". The IDE may look at the type being injected (in this case CreditCardProcessor) and, if the type is not injectable, it may be determined if a supertype or interface is injectable. A supertype or interface may be determined from the methods called on the processor object all being from a supertype or interface (such as 'PaymentProcessor'). The quick fix may be to offer the refactoring to the type that is known to be injectable in the production server. The method may loop round the classes interfaces and supertypes and determine if any are injectable in the production server environment (i.e. present as a source in the table described above). For those that are, the refactoring that may now be offered is similar to the "Use Supertype Where Possible" refactoring.

These enabled IDE features provide an improved programming environment for developing CDI applications that are more likely to be cleanly installable in the target production server.

This described method and system may be implemented through the deployment phase enabling feedback to a subsequent development phase.

Another CDI related feature that is enabled by the described method and system is remote debugging that may be performed from the IDE with "step into" being resolved correctly to the actual implementation that is going to be injected in production.

When debugging and wanting to "step into" the implementation of a bean's method the IDE may now be aware that the implementation is being proxied by CDI and which "real" user implementation will be resolved on the server. The IDE may thus set a breakpoint on entry to the implementation method that enables "step into" to operate correctly, skipping over the actual infrastructure code and stopping in the user's method.

The metadata coming directly from production systems is an enabler of a set of features in a developer IDE. This has the advantage of not only tying the information about the provided injection sources and resolved targets directly into the developers working IDE source code context but also allows for the provision of a number of CDI related features.

The above description refers to use of the functionality in an IDE. This may equally be used in a unit-test environment.

The described method and system give the developer more awareness of the downstream injections that will occur when code is released. Typically, the developer need not worry about the downstream environments during initial work but during packaging and preparation for delivery, perhaps even as a check integrated into a regression suite, the ability to see "behind" the abstraction of what will be injected is useful.

The described method and system visualize the injection targets and sources in the user's typical working context as the IDE source files.

This method preempts potential deployment errors. If no injection target is found, it means the deployment error will occur. If more than one injection target is displayed, it indicates UnsatisfiedResolutionException will occur.

By bringing the production and development environments closer by literally applying "infrastructure as code" (but in the opposite direction to that usually meant by the term), the compression of the DevOps code-test-deploy process is assisted with the smooth, iterative flow of function into production systems.

Figure 3:
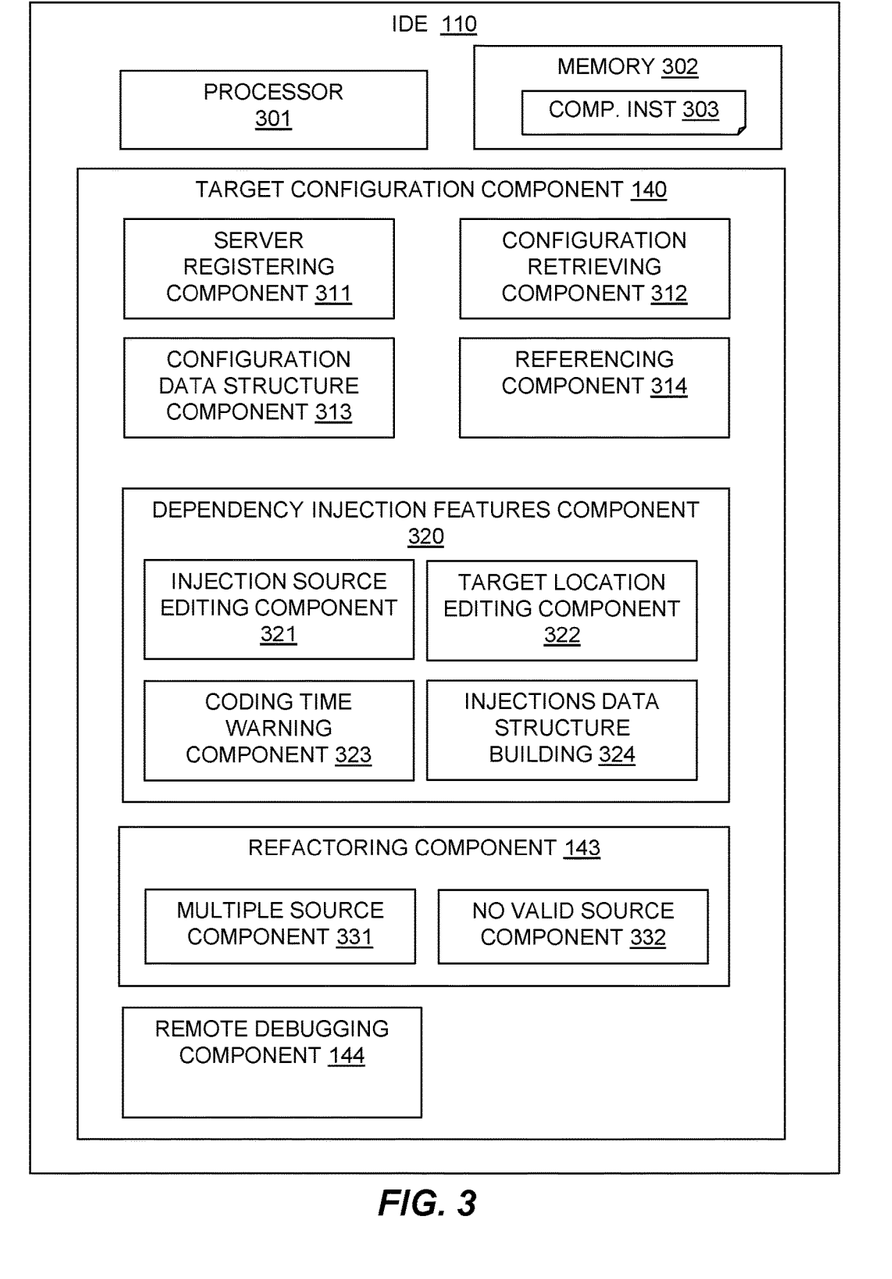
FIG. 3 is block diagram of an example embodiment of a system in accordance with the present invention.

Referring to FIG. 3, an example embodiment of the described system is provided in an IDE 110. The IDE 110 may include at least one processor 301, a hardware module, or a circuit for executing the functions of the described components which may be software units executing on the at least one processor. Multiple processors running parallel processing threads may be provided enabling parallel processing of some or all of the functions of the components. Memory 302 may be configured to provide computer instructions 303 to the at least one processor 301 to carry out the functionality of the components.

The IDE 110 may have a target configuration component 140 for receiving configuration information from a production server as described in relation to FIG. 1.

The target configuration component 140 may include a server registering component 311 for registering a configured target production server with the IDE 110 from which metadata may be retrieved via network connectivity. Alternatively, a representation of the configured target production server may be provided at the IDE 110 in the form of a serialized flat-file version of the datafile of a production server.

The target configuration component 140 may include a configuration retrieving component 312 for retrieving metadata relating to configuration data of a configured target production server or a representation of a production server. The configuration data of the configured target production server is retrieved from the production server when the IDE 110 is started or refreshed. The configuration data may relate to installed applications and resolved injections and is provided as infrastructure as code where a subset of the production infrastructure configuration is embodied as an artifact on request.

The target configuration component 140 may include a configuration data structure component 313 for forming a configuration data structure cross-referencing target injection sites and injectable sources determined from the configuration data wherein the configuration data structure is associated with the production server and available to the software development or test environment.

The target configuration component 140 may include a referencing component 314 for referencing the configuration data structure to carry out dependency injection related features in the software development or test environment.

The target configuration component 140 may include a dependency injection features component 320 for enabling dependency injection related features including: an injection source editing component 321 for enabling a selection of target sites for an injection source; and a target location editing component 322 for enabling a selection of injection sources for a target location.

The dependency injection features component 320 may include a coding time warning component 323 for incompatible content dependency injections and an injections data structure building component 324 for building an injections data structure of a network of injections between implementations and targets and updating the network after a change to the production server.

The target configuration component 140 may include a refactoring component 143 for enabling assisted refactoring of dependency injections ensuring correct code refactoring across multiple affected code locations and allowing visibility of any impact to the production server. The refactoring component 143 may include a multiple source component 331 for handling multiple valid possible injection sources for a target location and a no valid source component 332 for handling injection sources for a target location, if no injection source is valid.

The target configuration component 140 may include a remote debugging component 144 for enabling remote debugging of the software with a simulation being resolved correctly for an implementation that is going to be injected in a target production server.

Figure 4:
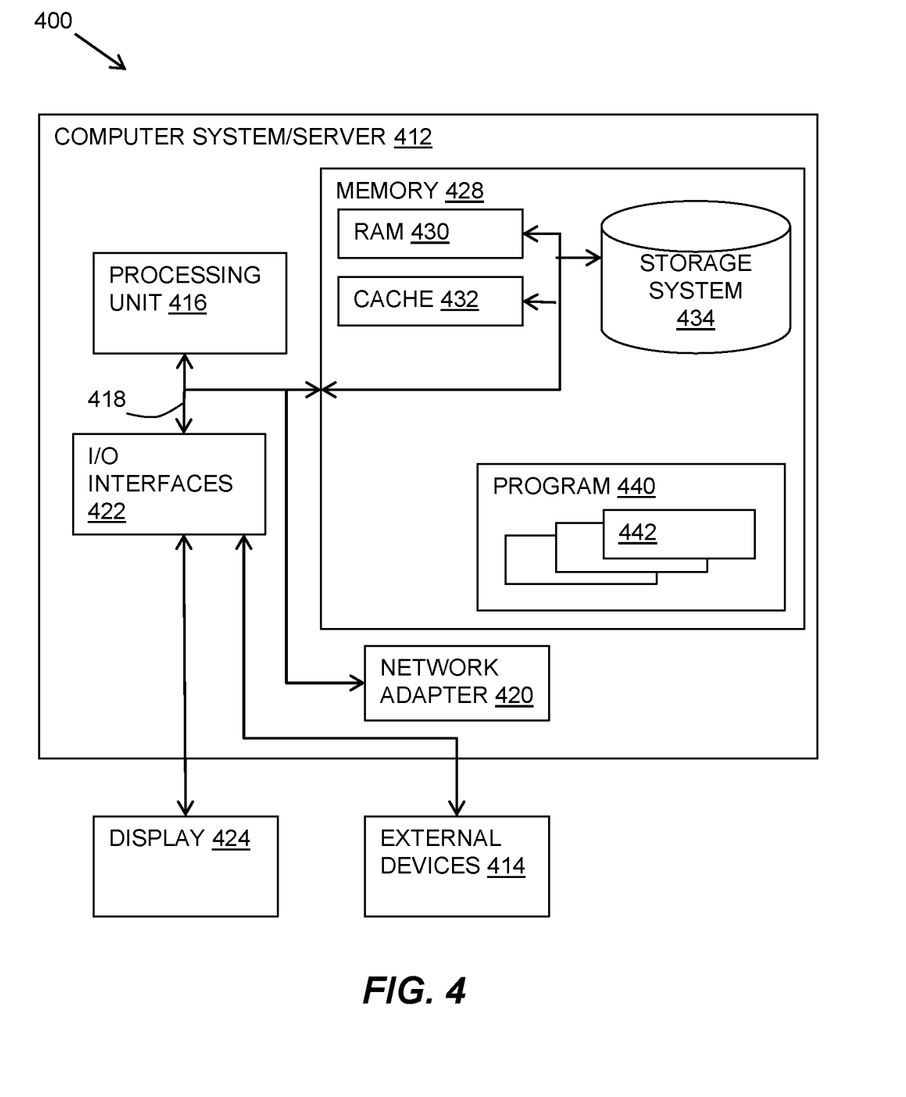
FIG. 4 is a block diagram of an embodiment of a computer system or cloud server in which the present invention may be implemented.

Referring now to FIG. 4, a schematic of an example of a system 400 in the form of a computer system or server is shown.

A computer system or server 412 may be operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

In FIG. 4, a computer system/server 412 is shown in the form of a general-purpose computing device. The components of the computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
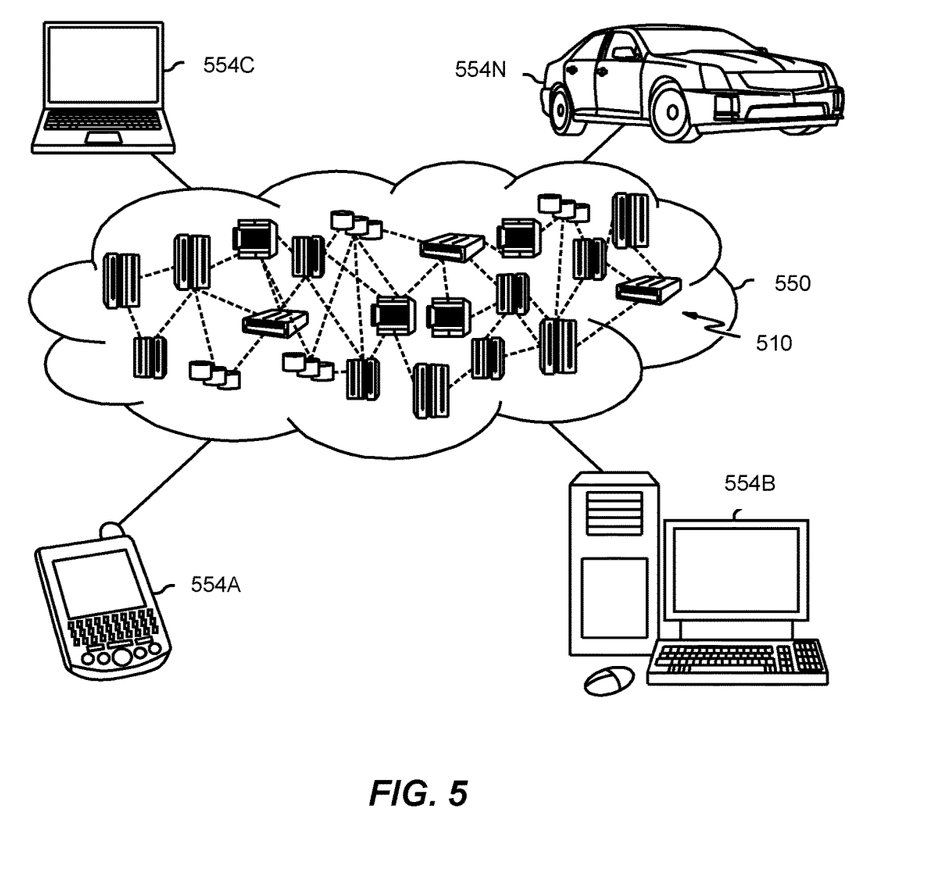
FIG. 5 is a schematic diagram of a cloud computing environment in which the present invention may be implemented.

Referring now to FIG. 5, illustrative cloud computing environment 550 is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
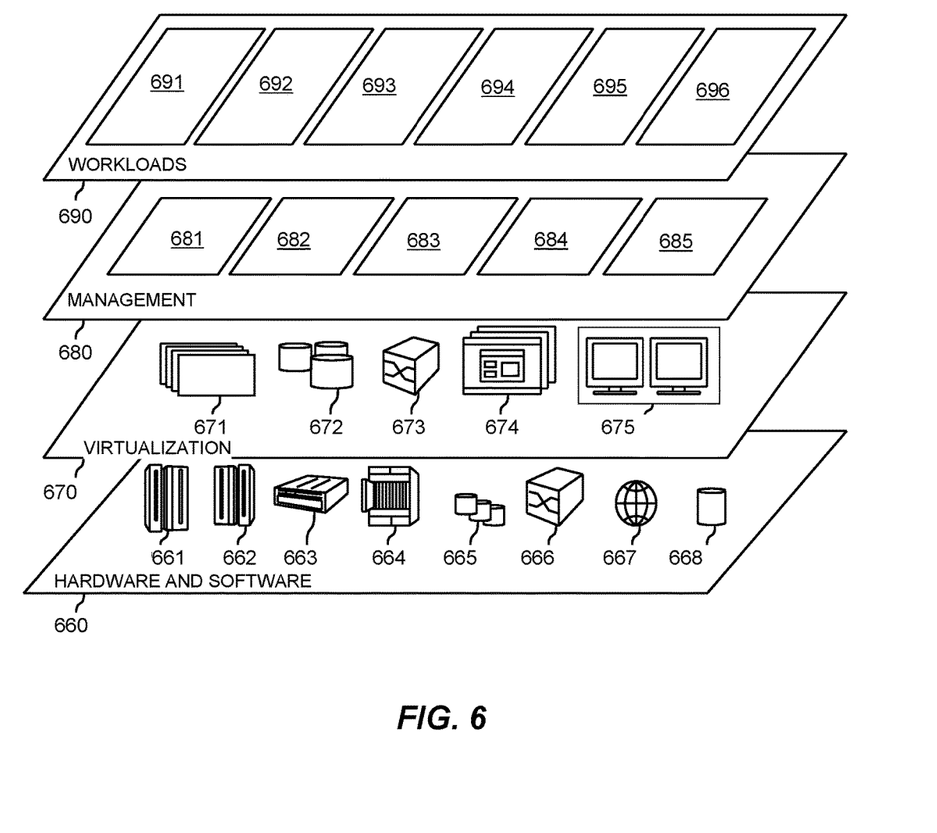
FIG. 6 is a diagram of abstraction model layers of a cloud computing environment in which the present invention may be implemented.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and dependency injection awareness in development environments 696.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for development-time awareness of a production dependency injection environment, wherein the method is carried out in a software development or test environment comprising:
   retrieving metadata relating to configuration data of injection sources and target injection sites in applications of a configured target production server or a representation of a configured target production server;
   determining the injection sources present in the production environment using the metadata, wherein the data includes location parameter data used by the applications, archives present on the location, injectable objects present in the archives, target injection sites in the archives, and class and qualifier information of injection objects, wherein the data is used to form a two-dimensional table data structure with the rows of the table representing "TO" and the columns representing "FROM";
   forming a configuration data structure cross-referencing target injection sites and injectable sources determined from the configuration data wherein the configuration data structure is associated with the production server and available to the software development or test environment; and
   referencing the configuration data structure to carry out dependency injection related features in the software development or test environment.

2. The method as claimed in claim 1, wherein referencing the configuration data structure to carry out dependency injection related features in the software development or test environment includes looking-up the configuration data structure for selection of possible target injection sites for an injection source.

3. The method as claimed in claim 1, wherein referencing the configuration data structure to carry out dependency injection related features in the software development or test environment includes looking-up the configuration data structure for selection of possible injection sources for a target injection site.

4. The method as claimed in claim 1, including:
   providing assisted refactoring of dependency injections by referencing the configuration data structure ensuring correct code refactoring across multiple affected code locations and allowing visibility of any impact to the production server.

5. The method as claimed in claim 1, including:
providing remote debugging of the software by referencing the configuration data structure with a simulation being resolved correctly for an implementation that is going to be injected in the production server.

6. The method as claimed in claim 1, including:
building an injections data structure of a network of injections between implementations and updating the network after a change to the production server.

7. The method as claimed in claim 3, wherein when the selection of possible injection sources for a target injection site includes more than one possible valid injection source, including:
flagging an error;
offering a qualifier refactoring action; or
converting the injection to a skeleton code for selecting the instance.

8. The method as claimed in claim 3, wherein when the selection of possible injection sources for a target injection site has no valid injection source, including:
offering widening of a too narrow injection source type; or
suggesting amendment of a location parameter.

9. The method as claimed in claim 1, wherein the configuration data relates to installed applications and resolved injections or a new application configuration and is provided as infrastructure as code where a subset of the production infrastructure configuration is embodied as an artifact on request.

10. The method as claimed in claim 1, wherein retrieving metadata relating to configuration data of the configured target production server retrieves from the production server when the development or test environment is started or refreshed.

11. A system for development-time awareness of a production dependency injection environment in a software development or test environment, comprising:
a processor and a memory configured to provide computer program instructions to the processor to execute the function of the components;
a configuration retrieving component for retrieving metadata relating to configuration data of injection sources and target injection sites in applications of a configured target production server or a representation of a configured target production server;
a configuration determining component for determining the injection sources present in the production environment using the metadata, wherein the data includes location parameter data used by the applications, archives present on the location, injectable objects present in the archives, target injection sites in the archives, and class and qualifier information of injection objects, wherein the data is used to form a two-dimensional table data structure with the rows of the table representing "TO" and the columns representing "FROM";
a configuration data structure component for forming a configuration data structure cross-referencing target injection sites and injectable sources determined from the configuration data wherein the configuration data structure is associated with the production server and available to the software development or test environment; and
a referencing component for referencing the configuration data structure to carry out dependency injection related features in the software development or test environment.

12. The system as claimed in claim 11, including:
a dependency injection features component for providing dependency injection related features in the software development or test environment including:
an injection source editing component for enabling a selection of target injection sites for an injection source; and
a target location editing component for enabling a selection of injection sources for a target injection site.

13. The system as claimed in claim 11, including:
a refactoring component for providing assisted refactoring of dependency injections by referencing the configuration data structure ensuring correct code refactoring across multiple affected code locations and allowing visibility of any impact to the production server.

14. The system as claimed in claim 11, including:
a remote debugging component for providing remote debugging of the software by referencing the configuration data structure with a simulation being resolved correctly for an implementation that is going to be injected in the production server.

15. The system as claimed in claim 11, including:
an injections data structure building component for building an injections data structure of a network of injections between implementations and updating the network after a change to the production server.

16. The system as claimed in claim 13, wherein the refactoring component includes a multiple source component for handling multiple valid possible injection sources for a target injection site and a no valid source component for handling injection sources for a target injection site, if no injection source is valid.

17. The system as claimed in claim 11, wherein the configuration data relates to installed applications and resolved injections or a new application configuration and is provided as infrastructure as code where a subset of the production infrastructure configuration is embodied as an artifact on request.

18. The system as claimed in claim 11, including a server registering component for registering the configured target production server with the development or testing environment from which metadata is retrieved via network connectivity.

19. The system as claimed in claim 11, wherein a representation of the configured target production server is provided at the development or test environment in the form of a serialized flat-file version of the datafile of a production server.

20. A computer program product for development-time awareness of a production dependency injection environment in a software development or test environment, the computer program product comprising a computer readable storage medium having program instructions embodied therewith, the program instructions executable by a processor to cause the processor to:
retrieve metadata relating to configuration data of injection sources and target injection sites in applications of a configured target production server or a representation of a configured target production server;
determine the injection sources present in the production environment using the metadata, wherein the data includes location parameter data used by the applications, archives present on the location, injectable objects present in the archives, target injection sites in the archives, and class and qualifier information of injection objects, wherein the data is used to form a two-dimensional table data structure with the rows of the table representing "TO" and the columns representing "FROM";

form a configuration data structure cross-referencing target injection sites and injectable sources determined from the configuration data wherein the configuration data structure is associated with the production server and available to the software development or test environment; and reference the configuration data structure to carry out dependency injection related features in the software development or test environment.

* * * * *